United States Patent Office 3,445,445
Patented May 20, 1969

3,445,445
MODIFICATION OF POLYOLEFINIC RESINS
Herman S. Bloch, Skokie, and Louis Schmerling, Riverside, Ill., assignors to Universal Oil Products Company, Des Plaines, Ill., a corporation of Delaware
No Drawing. Filed June 13, 1966, Ser. No. 556,916
Int. Cl. C08f 27/03, 27/00
U.S. Cl. 260—93.7                    9 Claims

ABSTRACT OF THE DISCLOSURE

Polyolefinic resins can be halocarbonylated in a process whereby the polyolefinic resin is treated with carbon monoxide and a halo-substituted paraffinic compound.

---

This invention relates to a process for the modification of polyolefinic resins. More particularly, the invention is concerned with a process for the modification of certain polyolefinic resins by the introduction of a halocarbonyl radical into said resin.

The use of polyolefinic resins in modern day technology has increased to a large extent and it is necessary in many instances to have resins which possess certain different physical characteristics. By modifying these polyolefinic resins in a manner whereby certain radicals are introduced into the resin, it is possible to obtain novel compounds made from these polyolefinic resins which can be used as intermediates for a wide variety of purposes. As hereinbefore set forth, the present invention is concerned with a process for modifying polyolefinic resins by introducing a halocarbonyl radical into the resin. The halocarbonyl groups and particularly the chlorocarbonyl groups which are introduced into the radical will result in resins which may be used for a wide variety of purposes. For example, the chlorocarbonyl groups may be converted to carboxy and carboxamide groups thereby rendering the resin useful for paper coating, metal coating and in waxes, for polishes, etc., or wherever controlled amounts of carboxy or carboxamide functions may be required in order to improve the adhesion, emulsion or similar physical properties of the resin. Another use to which these modified resins may be put is that they may be reacted with polyamines or polyols to produce a cross-linking effect (either directly or by subsequent reaction with reactive bi-functional agents such as diisocyanates) which is similar to vulcanization, thereby rendering the finished products more suitable for use as replacements for rubber as in vehicle tires or whenever else toughness of the product is desired. For example, this method of so-called "vulcanization" which may be effected without the use of sulfur will be especially useful in certain types of polymers such as polyisobutylene or EP co-polymers which are active substitutes for natural rubber. In such uses, the carboxy groups formed from the halocarbonyl group will act to improve adhesion of the polymer to the tire cord, to the carbon black filler, etc. Yet another way in which the halocarbonyl group of the modified polyolefinic resin may be used is to form a carboxylic acid group from the halocarbonyl group and thereafter react this modified resin with an epoxide such as ethylene oxide to render the polyolefinic resin more water-dispersible, the finished resin then being used in emulsion coatings, etc.

It is therefore an object of this invention to provide a process for the modification of polyolefinic resins.

A further object of this invention is to provide a process for the introduction of halocarbonyl groups into a polyolefinic resin.

In one aspect, an embodiment of this invention is found in a process for the halocarbonylation of a polyolefinic resin which comprises treating said resin with carbon monoxide and a halo-substituted paraffinic compound at reaction conditions, and recovering the resultant halocarbonyl-substituted polyolefinic resin.

A specific embodiment of this invention is found in a process for the halocarbonylation of a polyethylene resin which comprises treating said resin with carbon monoxide and carbon tetrachloride in the presence of benzoyl peroxide in the temperature range of from about ambient to about 350° C. and a pressure in the range of from about atmospheric to about 2000 pounds per square inch, and recovering the resultant chlorocarbonyl-substituted polyethylene.

Other objects and embodiments will be found in the following further detailed description of this invention.

The present invention is concerned with a process for reacting a polyolefinic resin with carbon monoxide and a halogen-radical-yielding paraffinic compound in the presence, if so desired, of an activator to prepare modified polyolefinic resins containing halocarbonyl radicals. The halogen-radical-yielding paraffinic compound is preferably a tetrahalomethane such as, for example, carbon tetrachloride, carbon tetrabromide or in general any tetra-halomethane which under activated conditions, furnishes a chlorine or bromine radical. Other carbon tetrahalides which contain fluorine atoms as well as a chlorine or bromine atom which may be used include bromochlorodifluoromethane, dibromochlorofluoromethane, dichlorodifluoromethane, dibromodifluoromethane, trichlorofluoromethane, tribromofluoromethane, bromotrifluoromethane, chlorotrifluoromethane, and the like.

The carbon tetrahalide of the type hereinbefore set forth, carbon monoxide and the polyolefinic resin are reacted at temperatures ranging from about ambient (25° C.) up to about 350° C. or more depending upon the method of activation which is utilized. The method of activation will depend upon the particular activator as well as the carbon tetrahalide which is to be used. For example, when utilizing a carbon tetrahalide such as bromotrifluoromethane it is possible that the activation will be achieved by heating the reaction mixture without the presence of any outside activating agent. However, in the preferred embodiment of the present invention, the activating agent comprises an organic peroxide which will yield free radicals at the particular reaction conditions. Suitable free-radical-generating compounds which may be utilized include peroxy compounds containing the bivalent—O—O— radical which decomposes to form free radicals and initiates the reaction herein contemplated. Examples of such free-radical-generating compounds include the persulfates, perborates, percarbonates of ammonium and of the alkali metals. However, organic peroxy compounds constitute a preferred class of peroxy compounds, particularly acyl peroxides, as for example, acetyl peroxide, butyryl peroxide, lauroyl peroxide, benzoyl peroxide, diisopropyl benzoyl peroxide, etc., which upon decomposition form products which do not effect the hydrolysis of the desired product of the process of this invention. Other organic peroxy compounds which can be utilized include peracetic acid, persuccinic acid, dimethyl peroxide, diethyl peroxide, diisopropyl peroxide, di-t-butyl peroxide, tetralin peroxide, urea peroxide, t-butyl perbenzoate, t-butyl hydroperoxide, methylcyclohexyl hydroperoxide, cumene hydroperoxide, methylethylketone peroxide, cyclohexanone peroxide, etc., although decomposition products of peroxides such as those last described may tend to hydrolyze a portion of the halocarbonyl products and such peroxides are therefore less desirable than the aforesaid acyl peroxides. Mixtures of peroxy compounds may be employed, or said peroxy compounds may be utilized in admixture with various non-aqueous diluents. Thus, commercially available organic peroxy compounds compounded with various diluents, including benzoyl peroxide composited with calcium sulfate, benzoyl peroxide compounded with camphor, etc., may be utilized.

The present process is effected at a temperature at least as high as the initial decomposition temperature of the particular free-radical-generating compound employed. Free-radical-generating compounds such as peroxy compounds particularly organic peroxides, decompose at a measurable rate with time dependent in a logarithmic function upon temperature. This rate of decomposition is ordinarily expressed as the half life of the free radical generating compound at a particular temperature. For example, the half life in hours of lauroyl peroxide in paraffin hydrocarbon solvent is 20.6 hours at 60° C., 5.61 hours at 70° C., and 0.76 hour at 85° C. A reaction temperature is selected at which the free radical generating compound will decompose with the generation of sufficient free radicals to initiate the reaction and at which temperature the half life of said compound is such as to cause the reaction to proceed smoothly at a suitable rate. When the half life of the free radical generating compound is greater than about 10 hours, radicals are not generated at a sufficient rate to cause the contemplated reaction to go forward with satisfactory speed. Thus, the reaction temperature may be within the range of from about 50° C. to about 300° C. and at least as high as the decomposition temperature of the free radical generating compound, by which is meant a temperature such that the half life of the free radical generating compound is usually not greater than 10 hours. Since the half life for each free-radical-generating compound is different at different temperatures, the exact temperature to be utilized in a particular reaction will vary. However, persons skilled in the art are well acquainted with the half life versus temperature data for different free-radical-generating compounds. Thus it is within the skill of one familiar with the art to select the particular temperature needed for any particular initiator. However, the operating temperature generally should not exceed the decomposition temperature of the free-radical-generating compound by substantially more than about 150° C. since free-radical-generating catalysts decompose rapidly under such high temperature conditions. For example, the half life of benzoyl peroxide is less than 10 hours at 75° C., and therefore when this peroxy compound is used, the reaction temperature is from about 75° C. to about 300° C. but generally lower than about 225° C. A reaction temperature of from about 130° C. to about 280° C. is suitable when the peroxy compound is di-t-butyl peroxide, and from about 110° C. to about 300° C. but generally not in excess of about 260° C., with t-butyl perbenzoate. Higher reaction temperatures may be employed but little advantage is gained if the temperature is in excess of the decomposition temperature of the free-radical-generating compound by more than about 150° C. as hereinbefore mentioned. The free-radical-generating compounds can be utilized in relatively low concentration, for example, from about 0.1 to about 10 weight percent based on the weight of the carbon tetrahalide reactant.

The concentration of the reactants which are utilized in the process of this invention may be varied over a relatively wide range. The carbon monoxide, being somewhat less reactive than the carbon tetrahalide reactant, is generally utilized in a molar excess thereof, usually being present in at least about 2:1 molar excess. In addition, although the process of this invention is operable at atmospheric pressure, it is contemplated that superatmospheric pressures provided by the carbon monoxide up to about 2000 pounds per square inch may be used.

The process of this invention in which polyolefinic resins including, but not limited to, polyethylene, polypropylene, polyisobutylene, ethylene-propylene co-polymers, etc., are modified may be effected in any conventional or otherwise convenient manner and may comprise either a batch or continuous type operation. For example, when a batch type operation is used, the polyolefinic resin, the desired carbon tetrahalide and the free-radical-generating compound, if one is to be used, are charged to a suitable reaction vessel provided with adequate heating and mixing means such as a rotating autoclave. The vessel is then sealed, preferably flushed with dry nitrogen and thereafter brought to the desired initial pressure by charging carbon monoxide thereto. The reaction vessel and contents thereof are then heated to the desired reaction temperature for a pre-determined residence time which may be from about 0.1 to about 10 hours or more. Inasmuch as carbon monoxide is consumed in the reaction, the progress of the reaction may be ascertained by reference to the pressure of the vessel. In the event that a constant pressure is desired, it may be achieved by continuous or intermittent addition of carbon monoxide to the reaction vessel. Upon completion of the reaction, as evidenced by a lack of further pressure drop, heating is discontinued and the vessel is allowed to cool to room temperature. Upon reaching room temperature, the excess carbon monoxide is vented and the desired reaction product comprising a halocarbonylated polyolefinic resin is recovered from the reaction vessel.

Another method of conducting the process of this invention is by a continuous type of operation. In this type of operation, the reactants comprising the polyolefinic resin, the carbon tetrahalide, the carbon monoxide and, if so desired, the free-radical-generating catalyst are continuously charged to a reactor which is maintained at the proper operating conditions of temperature and pressure. Upon completion of the desired residence time, the desired product is continuously withdrawn as reactor effluent and separated from the trihalomethane by product and recoverable unreacted starting materials, the latter being recycled to form a portion of the feed stock.

It is also contemplated within the scope of this invention that other types of activating agents may be used to initiate the free radical chain reaction whereby the halocarbonyl radical is introduced into the polyolefin resin. Such a different type of activator is actinic light, a specific example of this being ultraviolet light. One source of this ultraviolet light is a low pressure mercury arc lamp or a medium pressure mercury arc lamp, said arc lamps emitting energy at a wave length less than about 3700 A. In addition, any other radiant form of energy which induces free-radical formation may also be utilized, although not necessarily with equivalent results. Activation by actinic light occurs most readily when bromotrichloromethane or carbon tetrabromide are employed as tetrahalomethanes.

The following examples are given to illustrate the process of the present invention which, however, are not intended to limit the generally broad scope of the present invention in strict accordance therewith.

EXAMPLE I

In this example, 100 g. of a polyethylene resin along with 200 g. of carbon tetrachloride and 5 g. of benzoyl peroxide are placed in the glass liner of a rotating autoclave. The liner is sealed into the autoclave and is flushed with dry nitrogen. Following this, carbon monoxide is pressured into the sealed autoclave until an initial pressure of 90 atmospheres at room temperature is reached. The autoclave is then heated to a temperature of about 90° C. and rotated for a period of about 4 hours during which time the maximum pressure will reach about 110 atmospheres. At the end of this time, the autoclave and contents are allowed to cool to room temperature, the final pressure being about 85 atmospheres. The autoclave is then vented to remove excess carbon monoxide and the reaction mixture is recovered. The desired chlorocarbonyl-substituted polyethylene resin is recovered by conventional means.

EXAMPLE II

A mixture of 100 g. of polypropylene resin, 60 g. of carbon tetrabromide and 5 g. of benzoyl peroxide is inserted into the glass liner of a rotating autoclave. The liner is placed in said autoclave, flushed with nitrogen and sealed. Following this, carbon monoxide is pressured into the sealed autoclave to bring the initial pressure to 90 atmospheres. The autoclave is then heated to a temperature of about 90° C. and rotated during a period of about 4 hours. At the end of this time, the autoclave and contents thereof are allowed to cool to room temperature and excess carbon monoxide vented therefrom. The autoclave is then opened and the desired bromocarbonyl-substituted polypropylene resin is recovered by conventional means.

EXAMPLE III

In this example, 100 g. of polyethylene resin along with 140 g. of bromotrifluoromethane is placed in the glass liner of a rotating autoclave. The liner is placed in the autoclave, flushed with nitrogen and sealed. Carbon monoxide is then pressured into the sealed autoclave to bring the initial pressure to 100 atmospheres and thereafter the autoclave is heated to a temperature of 275° C. The autoclave is then rotated for a period of about 4 hours while maintaining the aforementioned temperature. At the end of this time, the autoclave and contents thereof are allowed to cool to room temperature and excess carbon monoxide is vented therefrom. The autoclave is then opened and the desired bromocarbonyl-substituted polyethylene is recovered from the reaction mixture by conventional means.

We claim as our invention:

1. A process for the halocarbonylation of a polyolefinic resin which comprises treating said resin with carbon monoxide and a halo-substituted paraffinic compound at reaction conditions including a temperature in the range of from about ambient to about 350° C., and a pressure in the range of from about atmospheric to about 2000 pounds per square inch and recovering the resultant halo-carbonyl-substituted polyolefinic resin.

2. The process as set forth in claim 1, further characterized in that the process is effected in the presence of a free-radical generating catalyst.

3. The process as set forth in claim 1, further characterized in that the proces is effected in the presence of actinic light.

4. The process as set forth in claim 1, further characterized in that said halo-substituted paraffinic compound comprises a carbon tetrahalide.

5. The process as set forth in claim 4, further characterized in that said halo-substituted paraffinic compound comprises carbon tetrachloride.

6. The process as set forth in claim 4, further characterized in that said halo-substituted paraffinic compound comprises bromotrifluoromethane.

7. The process as set forth in claim 2, further characterized in that said free-radical generating catalyst comprises benzoyl peroxide.

8. The process as set forth in claim 1, further characterized in that said polyolefinic resin comprises polyethylene.

9. The process as set forth in claim 1, further characterized in that said polyolefinic resin comprises polypropylene.

References Cited

UNITED STATES PATENTS 3,033,838   5/1962   Ray _____ 260—94.9

JOSEPH L. SCHOFER, *Primary Examiner.*

L. EDELMAN, *Assistant Examiner.*

U.S. Cl. X.R.

117—132, 155; 260—88.2, 94.9